July 24, 1934.  E. JENNER  1,967,939
MOUNTING AND DRIVE TO FACILITATE MOWER SHARPENING
Filed Sept. 6, 1933  2 Sheets-Sheet 1
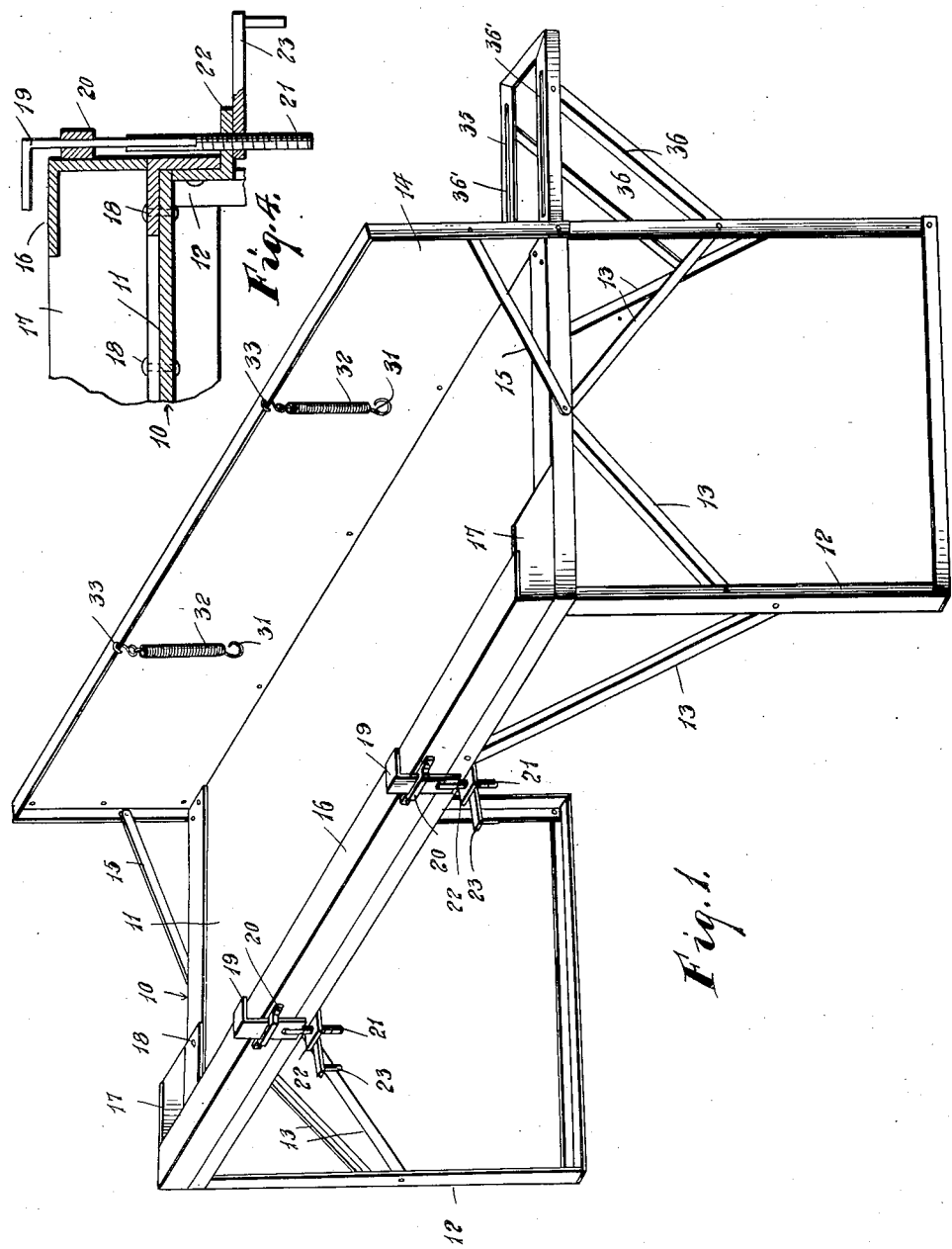
Inventor
E. Jenner,
By L. F. Rudolph Jr.
Attorney

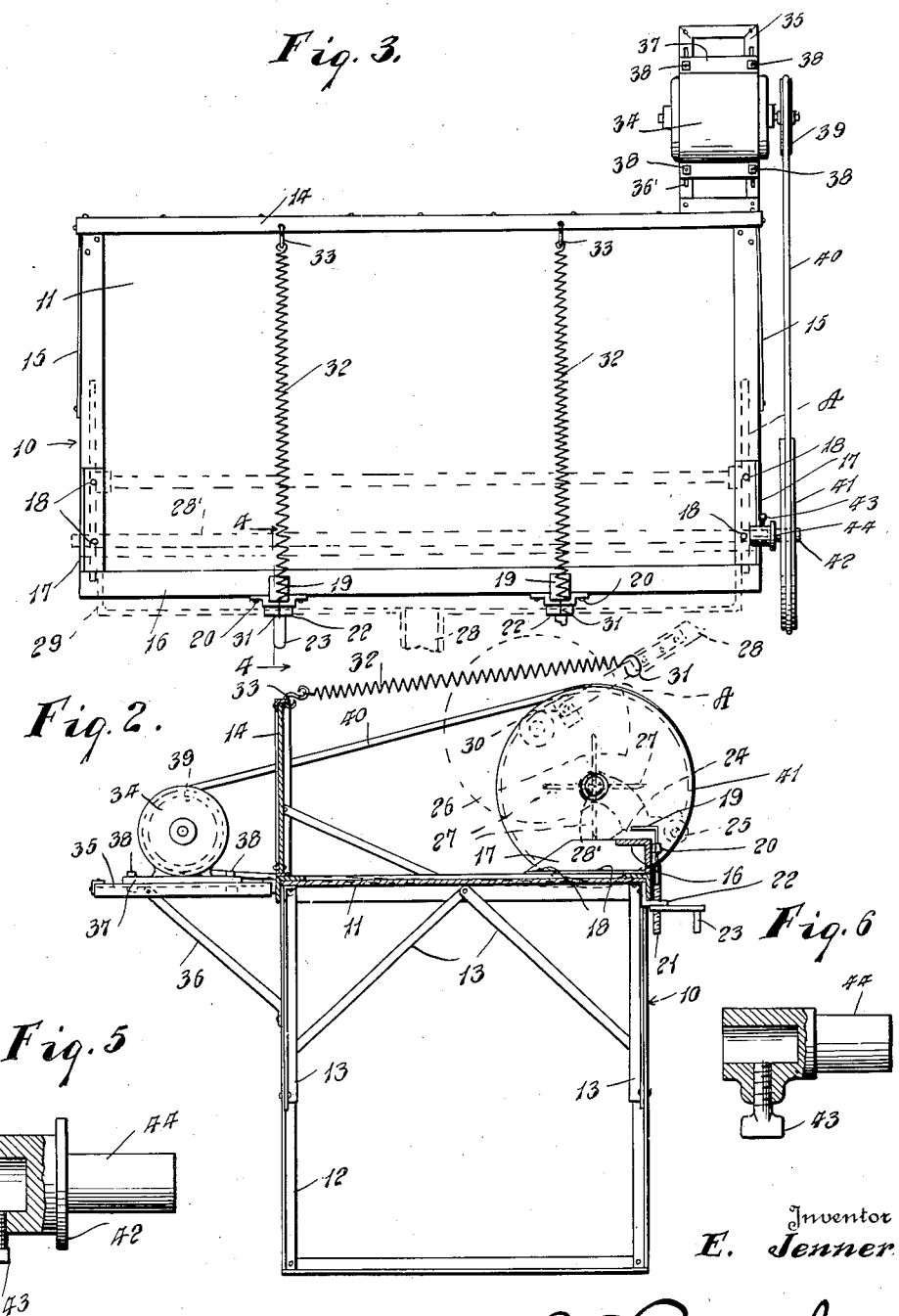

Patented July 24, 1934

1,967,939

UNITED STATES PATENT OFFICE 1,967,939

MOUNTING AND DRIVE TO FACILITATE MOWER SHARPENING

Edward Jenner, Goodrich, N. Dak.

Application September 6, 1933, Serial No. 688,386

3 Claims. (Cl. 51—26)

This invention relates to a mounting and drive to facilitate the sharpening of lawn mowers.

An important object of the invention is to provide for the sharpening of lawn mowers without the necessity of resorting to the use of an emery wheel or other rotating part or machine, in order to reduce the cost of sharpening to a minimum.

More specifically it is aimed to provide a means which will mount a lawn mower and drive the reel thereof so that through the abrasive action of ground emery or the like mixed with oil and applied to the blades and cutter bar will result in sharpening.

Another object is to provide a novel construction utilizing springs to urge the mower to position for fastening in the mounting and also to elevate the handle to a non-interfering position, in combination with a motor to drive the reel and clamp means to engage the cutter bar or ledger bar.

The more specific objects and advantages will become apparent from a consideration of the description following taken in connection with accompanying drawings illustrating an operative embodiment.

In said drawings:

Figure 1 is a perspective view of the table or mounting,

Figure 2 is a transverse sectional view through the table or mounting showing the motor and lawn mower in place, Figure 3 is a plan view of the parts of Figure 2, Figure 4 is a detail perspective view taken on the line 4—4 of Figure 3, and Figures 5 and 6 are detail views, partly in longitudinal sections, of chucks applicable to the shaft of the mower reel.

Referring specifically to the drawings, I provide a table or stand as a mounting or supporting structure, generally designated 10 and preferably made up of various sections of angle iron, bars and the like detachably bolted together so that the structure may be disassembled or knocked down in transit and when not in use. Such structure 10 comprises a table 11 supported by U-shaped frames 12 at opposite ends, in connection with diagonal braces at 13. A back 14 rises from the table, being braced with respect thereto as at 15.

Along the forward edge of the table 11, a bar 16 is disposed, preferably being a channel beam, having the channel opening rearwardly. Welded to the end of the channel are cleats 17 adapted to be riveted or bolted at 18 to the top 11.

Along the bar 16, a plurality of L-shaped clamp members 19 are disposed, being slidable through guide brackets 20 attached to the bar 16. The lower ends of the clamps have screw shanks 21 extending therefrom and loosely through brackets 22 mounted on the top 11 and below such brackets 22, nuts 23 are applied to the shanks 21. As suggested in Figure 2, where a conventional lawn mower A is shown, the cutter bar or ledger bar 24 thereof is disposed on the upper flange of the bar 16 and clamped thereto by the members 19 through the adjustment of the nuts 23, it being noted that the clamps extend between the cutter bar 24 and the ground roller 25 of said lawn mower A. The reel of said lawn mower is shown at 26 having blades 27 and a shaft 28' by means of which it is rotatably mounted. The handle of the said mower A is shown at 28, being connected to one or more brackets 29 in turn pivotally mounted at 30. The bracket or brackets 29 are adapted to be detachably engaged by hooks 31 of relatively strong contractile springs 32 hooked or flexibly attached at 33 adjacent the upper end of the back 14.

A motor, preferably an electric motor 34 is mounted on a support 35 attached to the table 11 and braced from the mounting as at 36. Such support 35 has elongated slots 36' and the base 37 of the motor has bolts 38 passing therethrough and through the slots 36 enabling the motor to be clamped at various adjustments relatively to the lawn mower, as is desirable in view of the differences in sizes and dimensions of various makes of lawn mowers. The main shaft of motor 34 has a pulley 39 thereon over which a belt 40 is trained. Such belt 40 in turn is trained over a pulley wheel 41 preferably having a V-shaped groove receiving the belt. Wheel 41 is adapted to be rigidly fastened in any suitable manner to a chuck or adapter 42 removably fastened by a screw or the like 43 to one end of the shaft 28'. As a result, the motor 34 is operable to drive the pulley 41, chuck 42 and reel 27 in a backward direction.

Prior to or while the reel is rotating, the operator applies to the cutter bar 24 and cutting edges of the blades 26, ground emery or other abrasive mixed with machine or cylinder oil, or other liquid. As a result, the abrasive action of such abrasive sharpens the blades 26 and cutter bar 24 equally, any adjustments of the blades and cutter bar which may be necessary, being made through the adjustment of the standard parts of the lawn mower. It is obvious that the adapter or chuck 42 may be of any desired size, shape, or the like, depending upon the particular lawn mower to be sharpened, and for instance that shown at 44 in Figure 6 may be used. Obviously any other form of drive instead of the belt drive shown may be substituted between the motor and the reel shaft.

Various changes may be resorted to provided they fall within the spirit and scope of the invention.

What I claim is:—

1. A structure of the class described having means to support a cutter bar of a mower, means operable to clamp the cutter bar to said means, means operable to rotate the reel of the mower to enable sharpening of the latter after application of abrasive thereto, and means to maintain the handle of the mower in elevated position and urge the mower into operative position on the structure.

2. A supporting structure of the class described having a bar, clamping means associated therewith to secure a cutter bar of a mower thereto, means operable to rotate the reel of the mower so that it will be sharpened after the application of abrasive thereto, a back on said supporting structure, and resilient means attached to said back to maintain the handle of the mower elevated and urge the mower into operative position on the structure.

3. A supporting structure of the class described having a bar, clamping means associated therewith to secure a cutter bar of a mower thereto, means operable to rotate the reel of the mower so that it will be sharpened after the application of abrasive thereto, resilient means to maintain the handle of the mower elevated and aid in securing the mower to the structure, said means to rotate the reel including a motor, a shelf on the structure adjustably mounting the motor for movement toward and away from the reel, a drive from the motor to the reel located beyond one end of the structure, and a back between the motor and reel, said resilient means extending from the back.

EDWARD JENNER.